Aug. 21, 1956   W. L. ARTHUR   2,759,452
MINERAL FEEDERS FOR RANGE STOCK
Filed March 22, 1954
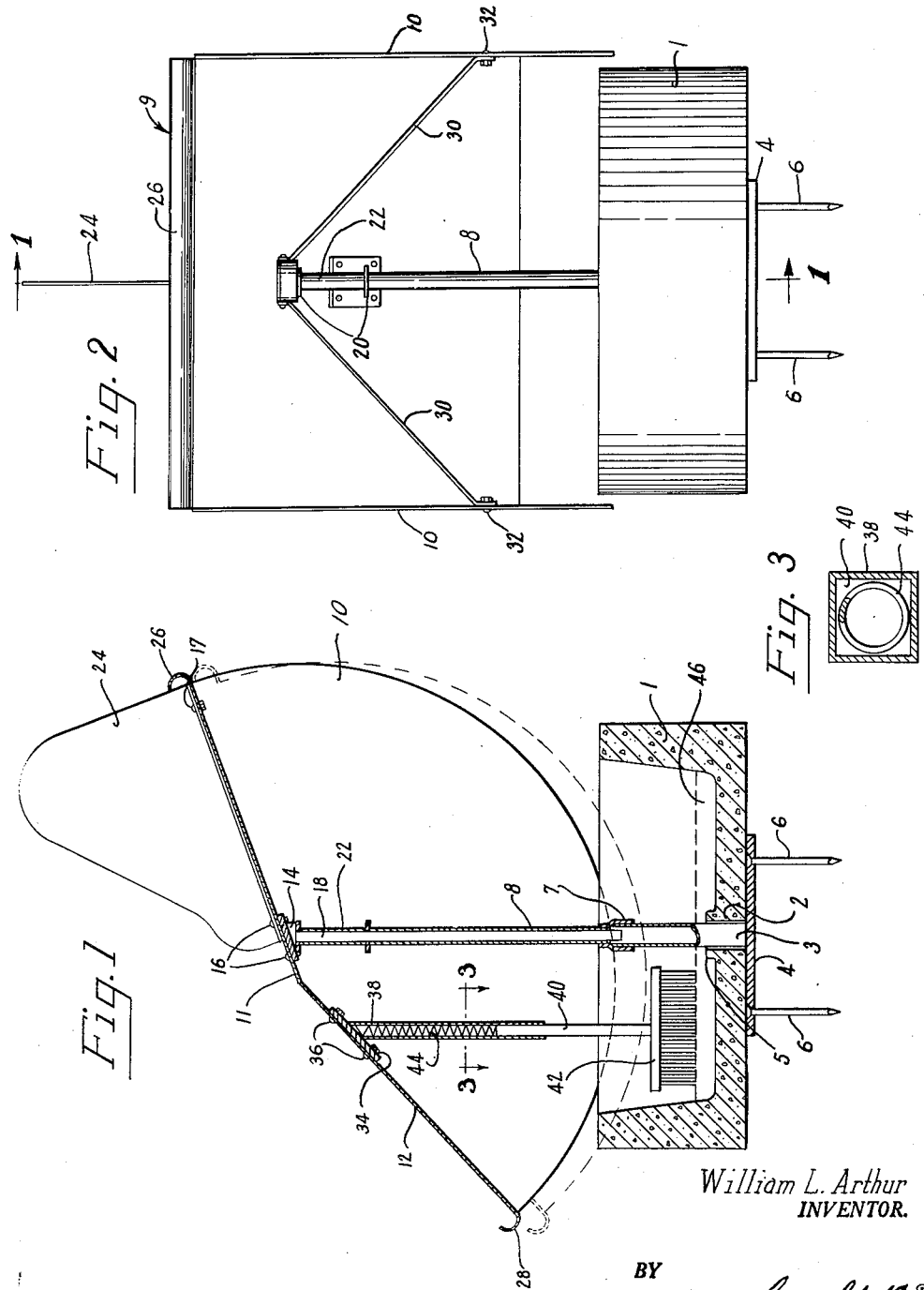
William L. Arthur
INVENTOR.
BY Wayland D. Keith
HIS AGENT

United States Patent Office 2,759,452
Patented Aug. 21, 1956

2,759,452

MINERAL FEEDERS FOR RANGE STOCK

William L. Arthur, Henrietta, Tex.

Application March 22, 1954, Serial No. 417,557

2 Claims. (Cl. 119—51)

This invention relates to improvements in salt and mineral feeders for range stock and more particularly to outdoor feeders, the contents of which is protected from the elements, but which is available to the animals at all times.

Various feeders have been proposed heretofore, but these for the most part lacked the rigidity and solidarity to withstand the rugged use and abuse to which such feeders are subjected by a herd of stock, such as bulls, cows and the like.

The present invention is sturdily constructed, cannot be tipped or pushed over, and the contents of which is protected from the elements.

An object of this invention is to provide a feeder for range stock and the like, which will protect the salt and/or minerals from the elements and at the same time always present an open face from which the stock can feed.

Another object of this invention is to provide a feeder the weather protector for which is adjustable.

Another object of the invention is to provide a range feeder for salt, minerals and the like, the contents of which is agitated by the revolving action of the weather protector.

A still further object of the invention is to provide a mineral feeder that is so constructed that it cannot be pushed or tipped over to waste the contents thereof.

Yet another object of the invention is to provide a mineral feeder, the shape of the inside of the container being such that the contents is automatically fed down as the mineral is eaten away.

A still further object of this invention is to provide a mineral feeder that is sturdy yet simple in construction, easily assembled, disassembled and installed and effective in use.

With these objects in mind and others that will manifest themselves as the description proceeds, reference is to be had to the accompanying drawings, in which like reference characters designate like parts in the several views thereof, in which:

Fig. 1 is a sectional view taken substantially on the line 1—1 of Fig. 2, with parts broken away and shown in elevation to bring out the details of construction, with a portion of the weather protector shown in dashed outline to show an alternate position and the manner of adjustment thereof;

Fig. 2 is a front elevational view of the device; and

Fig. 3 is an enlarged sectional view taken on the line 3—3 of Fig. 1, looking in the direction indicated by the arrows.

With more detailed reference to the drawings, the numeral 1 designates generally a container or vat which may be made of plastic such as concrete, or of a resinous plastic or the like. It is preferable to have the container cylindrical in form, with the outer walls thereof substantially vertical, but with the inner wall sloping slightly inward toward the bottom, to enable the removal thereof from the mold, and to allow the contents to feed down toward the center as the mineral or the like is eaten from the container.

The vat 1 has a centrally formed hole 2 through the bottom thereof to receive an upstanding tubular standard 3 that is welded or otherwise secured to a base plate 4. An annular boss 5 surrounds the hole 2 that is formed centrally of the vat, so as to prevent the contents of the vat from passing out through the opening 2, should clearance exist between the wall thereof and the tubular member 3 which passes therethrough. The plate 4 has holes therein to receive spikes or stakes 6 so as to anchor the upright tubular standard in place, whereupon, the vat 1 is placed thereover. Upon placing the upright tubular standard 3 on the base plate 4, and having the stakes or spikes 6 in place, the vat 1 is placed over the upright standard, and a reducer 7 is screw threaded onto the upper end of the upright standard, which reducer 7 threadably receives an upstanding post 8.

A housing or weather protector designated generally at 9 has down-turned sides 10 and rearwardly sloping top portions 11 and 12 secured together and which housing has a mounting flange 14 positioned approximately centrally thereof and secured thereto by means of rivets 16 that pass therethrough and through the top portion 11 of the housing 9. A downwardly extending rod 18 is secured to the flange 14, as by welding and preferably extends downward through upstanding tubular post 8 into upright tubular member 3. Washers or thrust bearings 20 are positioned above and below a sizing nipple 22, which sizing nipple may be shortened or lengthened so as to lower or raise the protector housing 9, as indicated in dashed outline in Fig. 1.

The thrust washers 20 enable the free swinging movement of the housing 9 about the pivotal axis or rod 18, so upon the wing changing, a weather vane 24, that is secured to the top portion 11 by means of rivets 16 and 17, maintains the open face of the housing away from the direction from which the wind is blowing. The sloping top portion 11 has a re-entrant portion 26 which extends across the upper edge thereof so as to prevent rain off the edge thereof immediately forward the open face, and directs the water to the outer sides thereof from which it passes without entering the vat to despoil the contents thereof.

A similar re-entrant portion 28 is formed on the lower edge of the top portion 12 and extends thereacross so as to direct water from the lower side thereof to the outer edges of the housing 9 away from the interior of the vat.

Braces 30 extend downward from the flange 14 to a point near the lower edge of downturned sides to and are riveted thereto by means of rivets 32, so as to hold the sides 10 in spaced relation from upstanding tubular post 8.

A plate 34 is mounted along the under face of top 12 and is secured thereto by means of rivets 36. A rectangular tubular member 38 is secured thereto as by welding or the like and protrudes downward therefrom. A rectangular rod 40 is telescoped upward into tubular member 38 in sliding relation, which rod carries a brush or agitator 42 on the lower end thereof. A spring 44 is positioned intermediate plate 34 and the top of rectangular rod 40 so as to enable pressure to be applied downward on brush 42, so that, upon rotation of the weather protector generally designated at 9, the brush or agitator 42 will scratch the surface of the minerals 46, within the vat 1, so as to prevent their becoming solidified, which facilitates the feeding of the minerals, and allows them to be completely consumed, rather than being wasted.

It will be noted that by providing nipples 22 of different lengths, the weather protector 9 may be raised or lowered, so in rainy weather, the sides 10 can be allowed to protrude downward as indicated by the dashed outline in Fig. 1, and extend beyond the edge of the vat to afford more complete protection to the contents thereof, but the weather vane keeps the open side of the housing away from the wind so the contents of the vat is available to the animals at all times. In fair weather the protector 9 can be raised as high as desired, still the top portion will protect the minerals in the vat from the wind and direct rays of the sun, thus prevent the deterioration thereof.

When desired, the spikes 6 may be driven into the ground thus giving the device a solid footing so that it cannot be readily pushed around by the stock, or it may be elevated on a wooden platform or the like for the footing and the vat secured in place thereon by means of the spikes, which will prevent lateral movement of the vat with respect to the platform, or since the vat is usually comparatively heavy, the spikes may be dispensed with, as the weight of the vat can usually be counted upon to keep it from being readily overturned.

While the invention has been illustrated and described in some detail in one embodiment thereof, it is to be understood that changes may be made in the minor details of construction and adaptations made to various installations, without departing from the spirit of the invention, or the scope of the appended claims.

Having thus described the invention, what is claimed is:

1. In a mineral feeder for live stock, a cylindrical vat having upstanding exterior walls and inwardly sloping interior walls, a centrally positioned opening formed in the bottom of said vat, a base plate having an upstanding tubular member secured thereto, said vat being telescopically received by said upstanding tubular member to rest upon said base plate, an upstanding post telescopically received by said upstanding tubular member, a weather housing rotatably mounted on said post at the upper end thereof, said housing comprising a mounting flange, downturned sides and a rearwardly sloping top member secured together in such manner as to form a housing with an open side, said housing having brace members secured to the underside thereof, a depending rod secured to the under face of said housing, an agitator secured to the lower end of said depending rod, said agitator being rotatable with said weather housing and extending into said vat, and a weather vane secured along the top of said weather housing, said vane being substantially radial with respect to said post.

2. In a mineral feeder for live stock, a cylindrical vat having the interior thereof inwardly sloping toward the bottom, a centrally positioned hole formed in the bottom of said vat, a base plate having an upstanding tubular member secured thereto, said upstanding tubular member telescopically receiving said vat to rest upon said base plate, said base plate having spikes secured to the lower side thereof to secure said base plate and said vat against lateral movement, an upstanding post telescopically received by said tubular member, a weather housing rotatably mounted on the upper end of said post, said weather housing comprising a mounting flange, downturned sides and a rearwardly sloping top member secured together in such manner as to form a housing with an open side, said sides of said housing having brace members secured thereto and to said mounting flange, a plate secured to the underside of said weather housing, a depending tube secured to said plate, a rod telescopically received within the lower end of said tube, an agitator member mounted on the lower end of said rod, a spring within said tube intermediate said plate and said rod so as to apply downward pressure on said rod and said agitator which extends into said vat, said agitator being rotatable with said weather housing, and a weather housing, and a weather vane secured along the upper portion of said top, said vane being substantially radial with respect to said post.

References Cited in the file of this patent
UNITED STATES PATENTS

| | | |
|---|---|---|
| 744,509 | Donahoo | Nov. 17, 1903 |
| 752,427 | Stoner | Feb. 16, 1904 |
| 1,037,093 | Wendorf et al. | Aug. 27, 1912 |
| 1,333,775 | Picotte | Mar. 16, 1920 |
| 1,796,466 | Lage | Mar. 17, 1931 |
| 2,566,446 | Gomer | Sept. 4, 1951 |
| 2,583,911 | Webster | Jan. 29, 1952 |
| 2,682,255 | Kleeman | June 29, 1954 |
| 2,691,958 | Lage | Oct. 19, 1954 |